Figure 1:
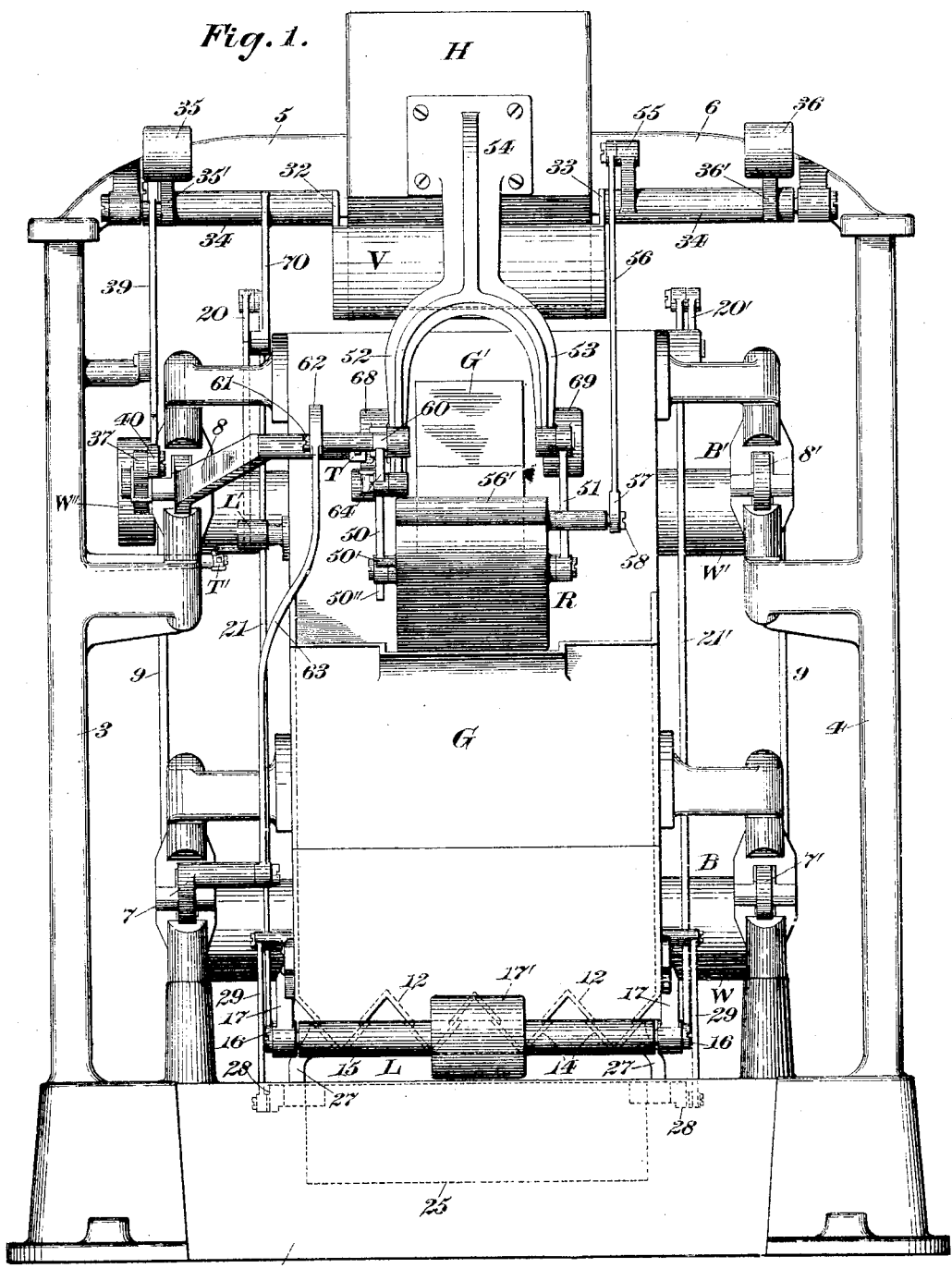

(No Model.)  7 Sheets—Sheet 1.

F. H. RICHARDS.
WEIGHING MACHINE.

No. 600,036.  Patented Mar. 1, 1898.

Witnesses.
H. C. Bissell.
Fred J. Dole.

Inventor:
F. H. Richards.

(No Model.)

F. H. RICHARDS.
WEIGHING MACHINE.

No. 600,036. Patented Mar. 1, 1898.

Witnesses
H. C. Bissell.
Fred. J. Dole.

Inventor
F. H. Richards.

(No Model.)
7 Sheets—Sheet 4.

F. H. RICHARDS.
WEIGHING MACHINE.

No. 600,036. Patented Mar. 1, 1898.

Witnesses
H. C. Bissell.
Fred. J. Dole.

Inventor:
F. H. Richards, (No Model.)
7 Sheets—Sheet 5.

F. H. RICHARDS.
WEIGHING MACHINE.

No. 600,036. Patented Mar. 1, 1898.

Witnesses
H. C. Bissell.
Fred. J. Dole

Inventor:
F. H. Richards (No Model.) 7 Sheets—Sheet 6.

F. H. RICHARDS.
WEIGHING MACHINE.

No. 600,036. Patented Mar. 1, 1898.

Witnesses:
H. C. Bissell.
Fred. J. Dole.

Inventor:
F. H. Richards.

(No Model.)  7 Sheets—Sheet 7.

F. H. RICHARDS.
WEIGHING MACHINE.

No. 600,036.  Patented Mar. 1, 1898.

Witnesses.
H. C. Bissell
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,036, dated March 1, 1898.

Application filed June 1, 1897. Serial No. 638,900. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, certain of the improvements being particularly adapted for application to machines of the kind disclosed by Letters Patent No. 572,067, granted to me November 24, 1896.

One of the objects is to furnish, in conjunction with weighing mechanism embodying a plurality of load-receivers one of which is preferably valveless and is adapted to deliver a stream to the other and means for supplying an overload to the respective receivers, part of which is directed to the valveless receiver, a receptacle normally located at one side of the stream flowing from the valveless receiver, and means for moving said receptacle into the path of said stream, whereby it is adapted to receive the surplus removed from the weighing mechanism. The surplus-receiving receptacle just mentioned is preferably mounted for oscillation about two different axes, it being adapted when swung into the path of the stream to catch the same and being subsequently swung out of the path, and at a succeeding period said receptacle is tilted to discharge its contents into the empty load-receiver, this last-mentioned operation taking place when the load-receiver has risen to receive a new charge.

Another object of the invention is to provide a load-receiver having a discharge-outlet furnished with a bar or bars across said outlet and a closer consisting of a plurality of bars movably mounted and adapted when shut to cover the spaces between the bar or bars first mentioned, whereby said closer can be maintained in its shut position by a very small amount of power.

Figure 4:
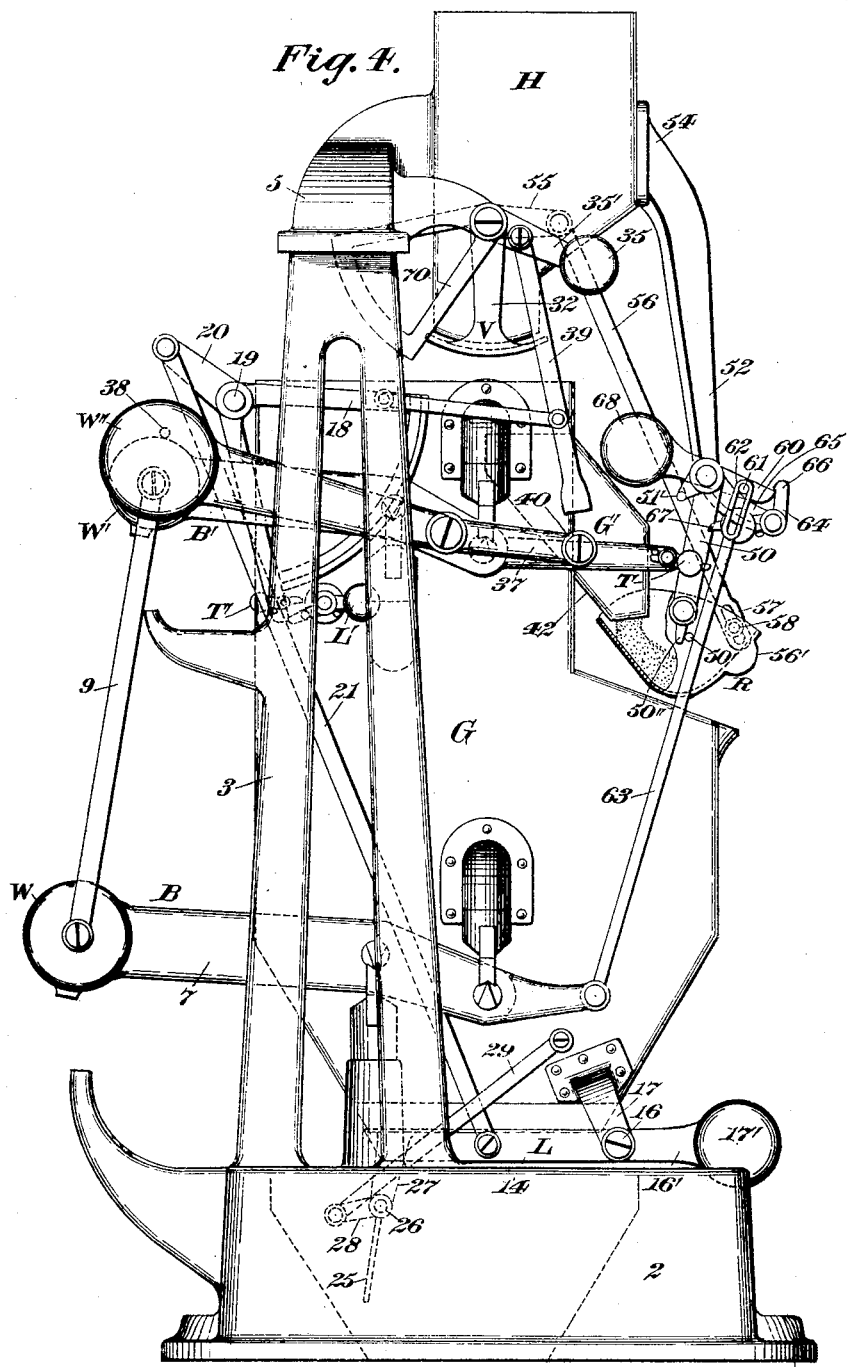
Figure 5:
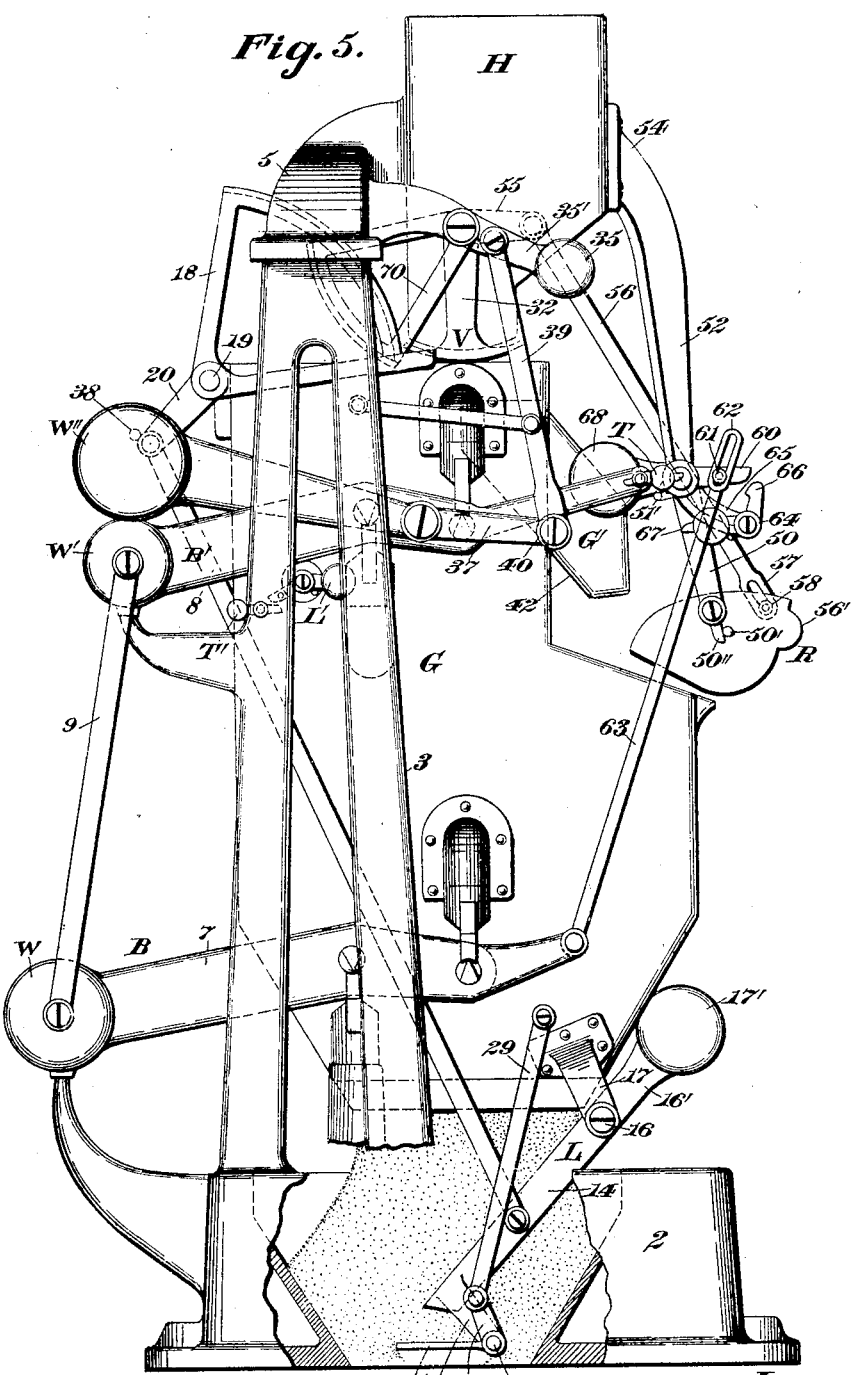
Figure 6:
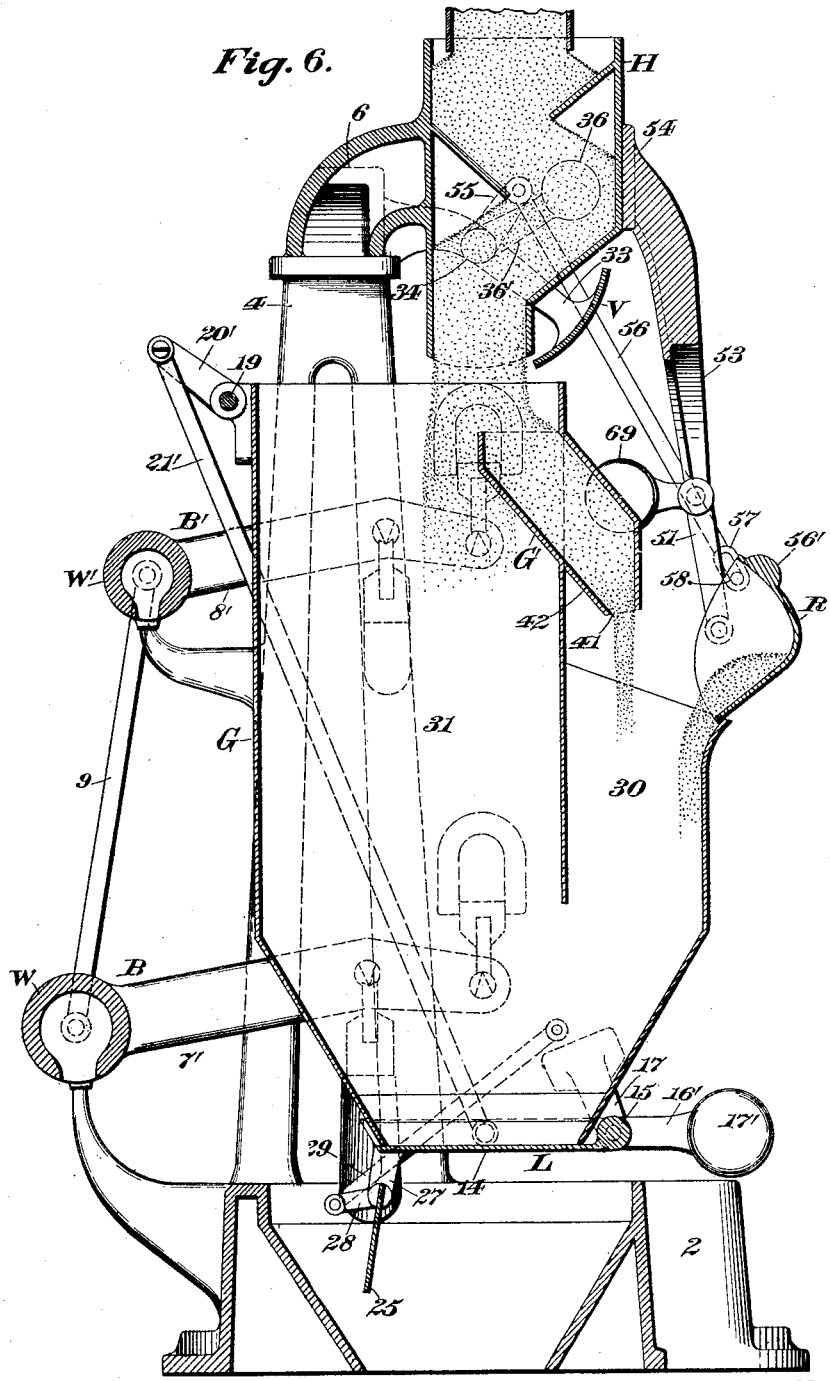
Figure 7:
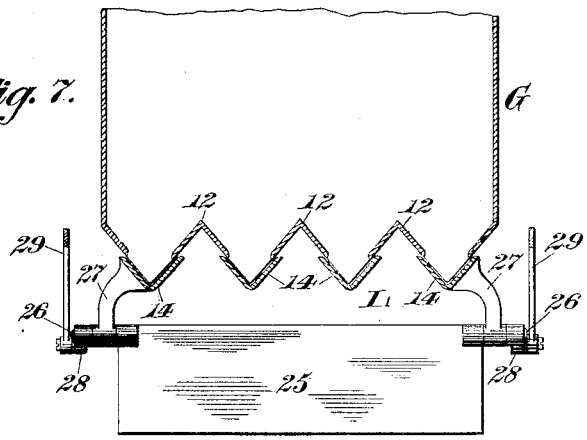
Figure 8:
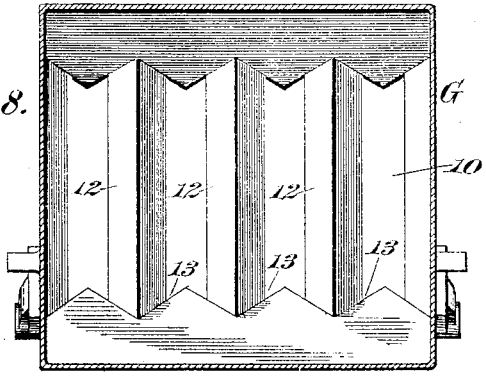
Figure 9:
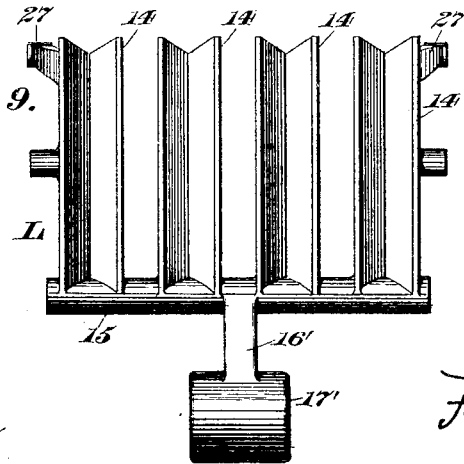

In the drawings accompanying and forming part of this specification, Figure 1 is a rear elevation of my improved weighing-machine. Figs. 2, 3, 4, and 5 are side elevations of the machine as seen from the left in Fig. 1, showing the positions occupied by the several parts during the making and discharge of a load. Fig. 6 is a longitudinal central section of the machine. Fig. 7 is a transverse central section of the lower part of the load-receiver and the closer. Fig. 8 is a plan view of the same, and Fig. 9 is a plan view of the closer.

Similar characters designate like parts in all the figures of the drawings.

The framework upon which the several parts of the machine are sustained may be of any suitable character. It is represented consisting of the chambered base or bed 2, the side frames or columns 3 and 4 rising therefrom, and the brackets 5 and 6, which extend oppositely from the supply-hopper H, the latter, in connection with a suitable valve, serving as a convenient means for delivering to the load-receiver or load-receivers of the weighing mechanism an overload or excess of material.

The weighing mechanism may be of any suitable type. In the form represented it consists of a series of beams, as B and B', and a plurality of receivers, as G and G', and when the load-receiver is hereinafter mentioned it is to be understood that the main load-receiver G is meant, as the load is made up in the same.

The beams B and B' are of the kind disclosed by the Letters Patent hereinbefore referred to, they being mounted on the framework in the ordinary manner, and the load-receiver G being suspended from the poising ends of the beams, one of said beams being mounted above the other, whereby the load-receiver will be steadied as it reciprocates. Each of the beams consists of a pair of longitudinal arms joined at one end by a counterweight. The arms of the beam B are designated by 7 and 7', and the arms of the beam B' are designated by 8 and 8', respectively, the counterweights being denoted by W and W', respectively. The two weights are connected by the links 9, pivoted to said parts, whereby the simultaneous movement of said members is assured as the weighing mechanism reciprocates.

The load-receiver has in its lower end a discharge-outlet, such as 10, across which extend a series of bars, as 12, preferably angular in cross-section, as shown in Fig. 7, the apexes of the several bars being uppermost, so as to offer the least resistance to the material when it is released from the load-receiver by the opening of the closer, as will hereinafter appear, said cross-bars being suitably secured to the load-receiver in the V-shaped recesses 13.

The closer, which is designated by L, is preferably mounted for oscillation, it consisting of a plurality of bars 14, adapted to cover the spaces between the fixed or stationary bars 12 on the load-receiver and extending from the rock-shaft 15. The shaft 15 has at its opposite ends suitable journal-openings adapted to receive the pivots or journals 16, carried by the bracket 17, suitably secured to the opposite sides of the load-receiver and obliquely depending therefrom, as shown in the several side elevations.

The bars 14 are channeled, as shown in Fig. 7, so that a comparatively large area is provided below the apexes of the several bars 12 to permit the material in the load-receiver substantially to arch over said spaces and to remove, as far as possible, all pressure on the several closer-bars 14, the mass being sustained to a considerable extent by the fixed bars 12.

Any suitable means may be provided for shutting the closer L, the shaft 15 being furnished with the radial arm 16', carrying a weight 17', which constitutes a convenient medium for this purpose. On the opening of the closer and after all the material has been discharged from the load-receiver the weight 17' is adapted to shut the same, in which position said closer can be held by a suitable detent, as the latch L'. The latch L' is of ordinary construction, being counterweighted and pivoted to the load-receiver near the upper side thereof and adapted to engage a suitable device, as the rocker 18, connected with the closer. The rocker 18 is affixed to the shaft 19, suitably supported on the upper rear side of the load-receiver and having the arm 20, to which is pivoted the connecting-rod 21, similarly attached at its lower end to the outermost bar 14 of the series. The opposite end of the shaft 19 is furnished with a crank 20', to which is pivoted the connecting-rod 21', likewise connected with the closer.

On the tripping of the latch L' by suitable means the closer L will be forced open by the discharging material from the load-receiver, and for the purpose of retarding the return movement thereof until the load-receiver is entirely emptied a suitable regulator, as 25, may be employed, the latter consisting of a straight plate having projecting trunnions, as 26, journaled in the depending brackets 27, secured to the forward ends of the outermost bars 14 of the closer.

Figure 2:
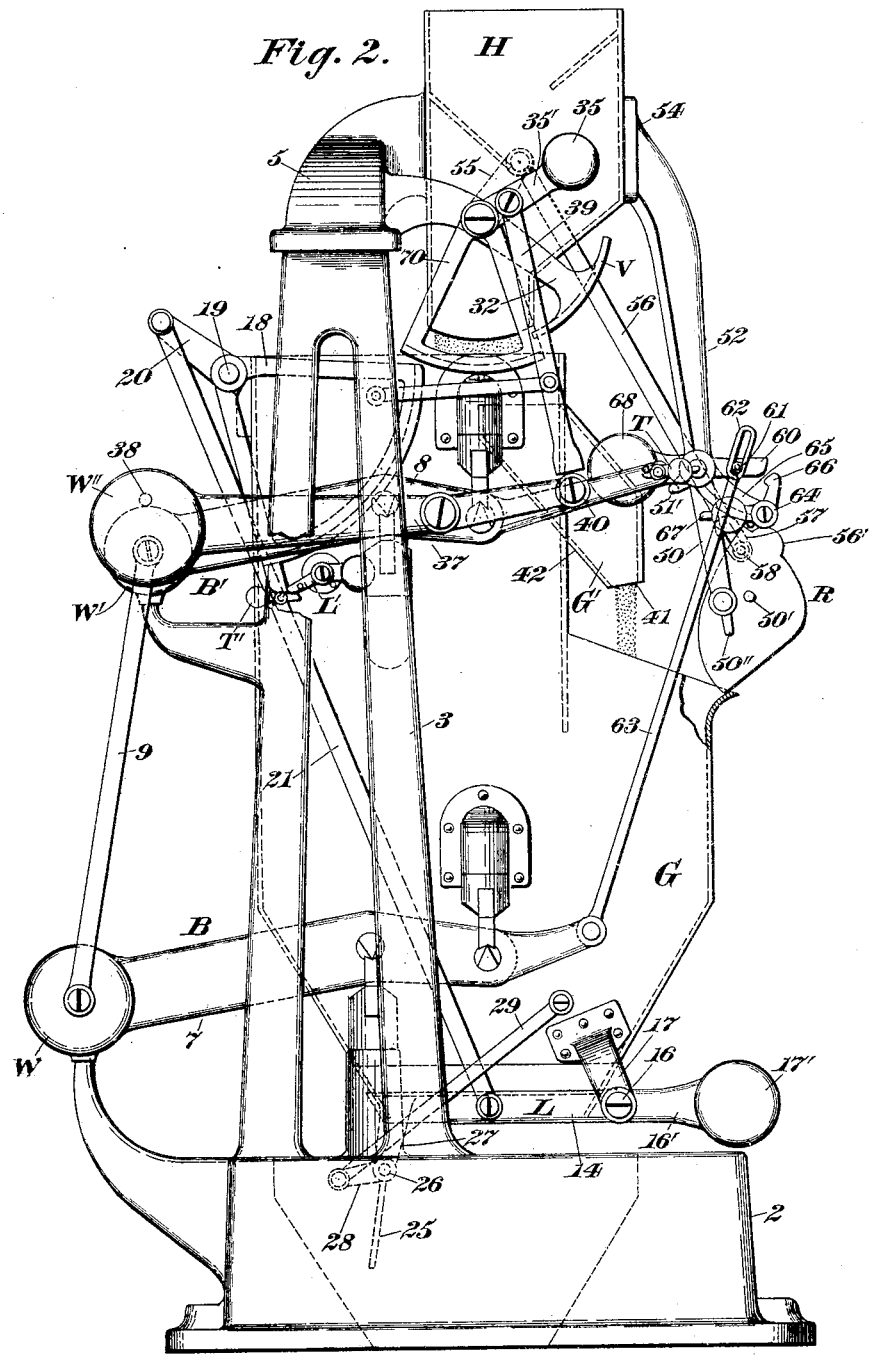

During the normal operation of the machine, as shown in Fig. 2, the regulator-plate 25 will be disposed substantially in a vertical position, but on the opening of the closer means will be called into action for shifting said regulator-plate, whereby it is presented substantially in a horizontal position to the outflowing material, such material being designed to act against the regulator to hold the closer open. For thus shifting the regulator it will be connected with a suitable resistance member, such as the load-receiver G. The trunnions 26 have secured thereto the crank-arms 28, to the outer ends of which are pivoted the links 29, also pivoted to the opposite sides of the load-receiver G; and it will be evident that when the closer L is opened the regulator, by reason of its connection with the load-receiver in the manner described, will be swung to a horizontal position, as shown in Fig. 5, whereby the material can act against the regulator to hold the closer open. When the closer shuts, the regulator will be returned to a vertical position to permit the material to pass therefrom.

As hereinbefore stated, means will be furnished for supplying the load-carrying means, which preferably includes a plurality of receivers, with an overload or quantity of material in excess or beyond that determined upon for a true charge and for also effecting the removal of the surplus. As also stated, the hopper H, in connection with a suitable valve, as V, constitutes a convenient means for thus overloading the two receivers G and G', the latter being obliquely disposed relatively to the main receiver G. The auxiliary receiver G' is suitably secured to the main load-receiver G and has its receiving end located below the hopper H, as shown in Fig. 6, whereby it is adapted to receive a portion of the supply-stream flowing from the hopper H and is adapted also to deliver a stream into the chamber 30 of the main load-receiver G, the major part of the supply-stream being delivered to the main chamber 31 of the load-receiver G. The valve V is of the "oscillatory" type, its end arms 32 and 33 depending from the two-part valve-shaft 34, pivotally carried by the brackets 5 and 6, respectively, in the well-known manner.

The two sections of the valve-shaft 34 are provided with weights 35 and 36, secured to the outer ends of arms 35' and 36', respectively, thereon, the weights being adapted normally to swing the valve V under the outlet of the hopper to arrest the passage of material therefrom, it being understood that the supply is stopped when the receivers G and G' are overloaded. The closure of the valve V will be controlled by the weighing mechanism, the actuator or shifting-lever 37 being shown for this purpose, said lever being pivoted near the inner end of the beam-arm 8 and its weight W'' being furnished with the pin 38, resting on the adjacent weight W', whereby the opposite end of the lever constitutes in effect a fixed extension of the beam-arm 8.

The arm 35' has pivoted thereto the rod 39, the lower end of which bears against the projection or roll 40 on the inner end of the lever 37, whereby as the weighing mechanism descends the lever 37 will move in a corresponding direction, and the rod 39 being in contact therewith said lever will prevent the valve V from being closed too quickly by the weights 35 and 36. On the return movement of the lever 37 it is adapted, through the rod 39, for swinging the valve V open.

The greater part of the overload is supplied to the receiver G, the remainder being delivered to the auxiliary receiver G', from which the surplus is withdrawn, the discharge-outlet 41 of the auxiliary receiver G' being comparatively small or of reduced size, whereby said receiver G' is caused to retain a sufficient quantity of material to permit the removal of the surplus, this operation being effected by gravity on the flowing of the material down the inclined wall or side 42 of said receiver, the stream from the latter normally descending into the chamber 30 of the main receiver G, as shown in Fig. 6.

A suitable device will be provided for catching the surplus gravitating from the valveless receiver G', said device being normally located at one side of the path of the falling stream from the receiver G', but being shifted into position at a predetermined time to intercept such stream. Said device, which may be of any suitable construction, is shown in the form of a receptacle or pan R, supported for movement about two independent axes.

The receptacle or pan R is preferably first swung to a horizontal position and then moved toward the path of the stream running from the valveless receiver G' to the receiver G, whereby it can catch the material gravitating from said valveless receiver until sufficient has been withdrawn to reduce the amount in the two receivers to the requisite quantity, and any suitable means may be provided for successively operating said receptacle. The receptacle R is supported by a carrier or frame consisting of the two levers 50 and 51, said levers being pivoted to the branches 52 and 53 of the yoke-shaped bracket 54, suitably secured to the rear wall of the hopper H. For bringing the receptacle R to a horizontal position it preferably has a device secured thereto, as will hereinafter appear.

The valve-shaft 34 has a crank-arm 55, to which is pivoted the link 56, connected by a slide-joint at its lower end with the receptacle R, whereby the valve and receptacle can each have a certain amount of movement without affecting the other.

The lower end of the link 56 is furnished with a loop 57, embracing the lateral projection 58 on the valve. At the commencement of operation, as shown in Fig. 2, the lower end of the loop 57 will be in contact with the projection 58. As the valve V closes the link 56 will be thrust downward, so that by reason of the connection of said link with the receptacle the latter can be swung to a horizontal position by the action of suitable means, such as the longitudinal weight 56', secured to the upper rearward side of the receptacle, this operation being completed when the valve V is closed or until the stud 50' abuts against the stop 50'' on the lower arm of the lever 50. At a point slightly beyond this stage of the operation said receptacle will be swung forward or toward the path of the stream from the auxiliary receiver G', it being preferably connected with the weighing mechanism for this purpose. The carrying member or lever 50 of the receptacle R is provided with a rearwardly-extending arm 60, having a projection or stud 61, embraced by the loop 62 of the link 63, pivoted at its lower end to the arm 7 of the beam B, the lower end of said loop being against the projection at the commencement of operation.

As the beam B descends the link 63 will be drawn downward and the upper end of the loop carried against the projection at about the time the load-receivers have received the requisite load. On the continuation of such movement the link 63 is adapted to swing the two levers 50 and 51, and consequently the receptacle R, into the path of the stream from the receiver G' to catch the material.

A detent will be provided for holding the receptacle R in its shifted position. (Indicated in Fig. 4.) The detent shown for this purpose consists of the counterweighted latch 64, pivoted to the extension 65 of the bracket 54, the working arm of said latch being hooked, as at 66. Said hook is designed to engage the arm 60 of the lever 50 when the latter and the receptacle R are in their respective shifted positions, as represented in Fig. 4.

Means preferably operative with the weighing mechanism will be employed for releasing the receptacle R when the entire surplus has been withdrawn, whereby said receptacle can be swung out of the path of the stream from the receiver G', a tripper, as T, carried by the extended arm 8 of the beam B', being provided for this purpose. The tripper is of the "by-pass" type and is pivoted at the end of said arm.

On the downstroke of the weighing mechanism the tripper T will engage the coöperating latch 64 without affecting the same. On the ascent of the beam and when the true load is in the respective receivers G and G' the tripper T by engaging the projection 67 of the latch 64 will trip the latter and disengage the hook 66 from the arm 60, thereby releasing the receptacle R, whereby it can be swung out of the path of the stream from the receiver G' by the weights 68 and 69, secured to the levers 50 and 51, respectively. The weighted arms of the two levers 50 and 51 normally rest on suitable stops, as 51', secured to the bracket 54.

The closer-holding latch can be tripped in some suitable manner, as by the by-pass tripper T', carried by the side frame 3, said tripper being adapted to release the closer on the upstroke of the load-receiver G in the well-known manner.

The valve V is furnished with a stop, as 70, designed to coöperate with a stop connected with the closer, as the rocker 18, these parts being substantially similar in construction and mode of operation to the stops disclosed by the Letters Patent hereinbefore referred to.

Figure 3:
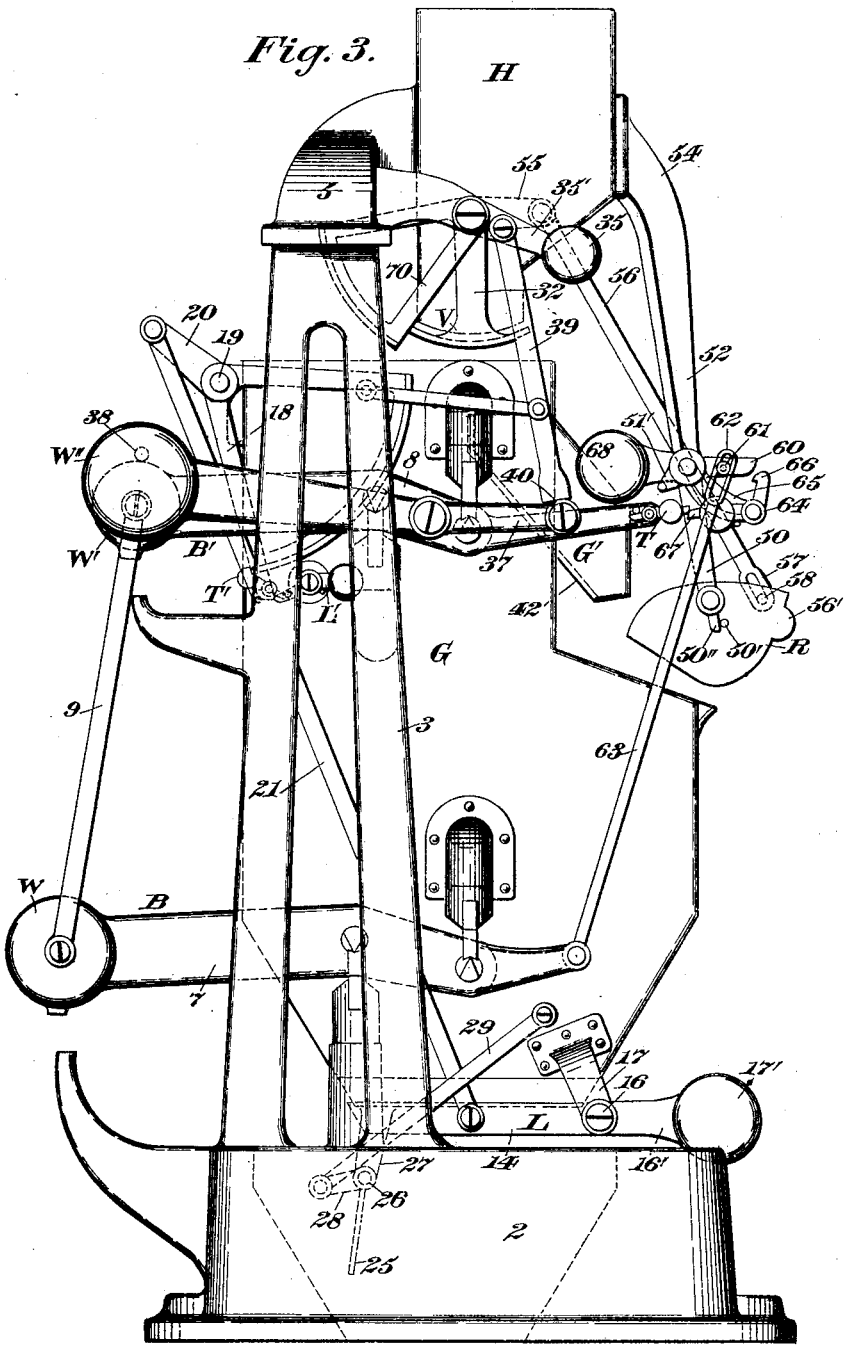

When the closer L is returned to its shut position by the falling of the counterweight 17' and is latched shut, the actuator or counterweighted lever 37 will return to its normal position and in so doing will force the valve V open, as represented in Figs. 5 and 3. As the valve V is opened, the link 56 will be raised until the lower end of the loop 57 abuts against the coöperating projection 58 of the receptacle R, whereby said receptacle will be tilted to discharge its contents into the empty load-receiver G.

The operation of the hereinbefore-described machine, briefly set forth, is as follows: The parts are shown in their normal positions in Fig. 2, the closer L being held shut by the latch L', which is in engagement with the rocker 18, and the valve V being wide open a stream of large volume will enter the load-receivers G and G', and when a certain part of the charge has been received said receivers, with the several beams, will descend, whereby the free end of the lever 37 or the projection or roll 40 thereon by falling away from the connecting-rod 39 will permit the valve V to be closed by the dropping of the counterweights 35 and 36, this operation being completed when the two load-receivers have been overloaded, the auxiliary receiver G' being filled, the outlet of said auxiliary receiver being made comparatively small to prevent the stream from flowing too rapidly therefrom. When the valve V shuts, the link 56 will be thrust downward, as shown in Fig. 3, thereby moving the lower end of the loop 57 away from the projection 58 on the receptacle R, so that the latter can be swung to its horizontal position by the counterweight 56', as shown in Fig. 3. When the load-receiver and several beams have nearly reached the end of their descending movement, the upper end of the loop 62 will abut against the stud 61 on the arm 60 of the lever 50, thereby swinging the two levers 50 and 51 and the receptacle R forward and moving the latter under the outlet of the receiver G', as shown in Fig. 4, in which position said receptacle is held by the gravity-latch 64, the hook 66 of which engages the lever-arm 60, as shown in said figure, whereby the receptacle is adapted to catch material emerging from the receiver G'. When the two receivers are lightened by the removal of material from the receiver G', they will rise, and when the surplus has been withdrawn the tripper T, which had previously passed below the projection 67 of the latch 64, will abut against the same and disengage the hook 66 of said latch from the arm 60, whereby the weights 68 and 69 can swing the receptacle rearward and from beneath the outlet of the receiver G', as shown in Fig. 5. When the receiver G has reached the limit of its downstroke, the latch L' will have passed to a point below the tripper T'; but on the lightening of the weighing mechanism by the removal of the surplus and when the latter has been entirely withdrawn the latch will strike the tripper and be disengaged from the rocker 18 to effect the release of the closer L. When the closer is released, the mass in the load-receiver is adapted to force the same open, and when the load is entirely emptied from the load-receiver and the closer is shut the parts will be returned to their initial positions to repeat the operation, and as the valve V opens it will, by reason of its connection with the receptacle R, tilt the same, as shown in Fig. 2, to discharge the contents of said receptacle into the empty receiver G.

Having described my invention, I claim—

1. The combination, with weighing mechanism comprehending a plurality of receivers one of which is valveless and is adapted to deliver a stream of material to the other; of means for supplying an overload to the receivers, part of which is directed to the valveless receiver; a receptacle normally located at one side of the stream flowing from said valveless receiver; and means for moving said receptacle into the path of said stream.

2. The combination, with weighing mechanism including a plurality of receivers one of which is valveless, the valveless receiver being adapted to deliver a stream of material to the other receiver; of means for supplying an overload to the receivers, part of which is directed to the valveless receiver; a receptacle normally located at one side of the stream flowing from the valveless receiver; and means for successively moving said receptacle into and out of the path of said stream.

3. The combination, with weighing mechanism including a plurality of receivers one of which is valveless, the valveless receiver being located to deliver a stream of material to the other receiver; of means for supplying an overload to the receivers, part of which is directed to the valveless receiver; an oscillatory receptacle normally located at one side of the stream flowing from said valveless receiver; and means for moving said receptacle into the path of the stream.

4. The combination, with weighing mechanism, of means for supplying an overload thereto and for subsequently effecting the removal of the surplus; a surplus-receiving receptacle oscillatory about two axes; and means for shifting said receptacle.

5. The combination, with weighing mechanism, of means for supplying an overload thereto and for subsequently effecting the removal of the surplus; a surplus-receiving pan movable about two axes; and means for shifting said pan.

6. The combination, with weighing mechanism, of means for supplying an overload thereto and for subsequently effecting the removal of the surplus; a surplus-receiving receptacle oscillatory about two axes; and means secured to said receptacle for operating the same.

7. The combination, with weighing mechanism, of means for supplying an overload thereto and for subsequently effecting the removal of the surplus; a surplus-receiving receptacle oscillatory about two axes; and means for shifting said receptacle in position to receive the surplus.

8. The combination, with weighing mechanism, of means for supplying an overload thereto and for subsequently effecting the removal of the surplus; a surplus-receiving receptacle and movable about two axes; means for shifting said receptacle in position to receive the surplus; and a device for holding said receptacle in its shifted position.

9. The combination, with weighing mechanism, of means for supplying an overload thereto and for subsequently effecting the removal of the surplus; a counterweighted surplus-receiving receptacle oscillatory about two axes; and means for shifting said receptacle in position to receive the surplus.

10. The combination, with weighing mechanism; of means including a valve, for supplying an overload thereto and for subsequently effecting the removal of the surplus; a surplus-receiving receptacle oscillatory about two axes; and a connection between the valve and the receptacle.

11. The combination, with weighing mechanism; of means including a valve, for supplying an overload thereto and for subsequently effecting the removal of the surplus; a surplus-receiving receptacle oscillatory about two axes and having a projection; and a link provided with a loop at one end embracing said projection, the other end of the link being connected with the valve.

12. The combination, with weighing mechanism comprehending a plurality of receivers one of which is valveless and is adapted to deliver a stream of material to the other; of means for supplying an overload to the receivers, part of which is directed to the valveless receiver; a receptacle normally located at one side of the stream flowing from said valveless receiver; and means connected with the weighing mechanism for moving the receptacle into the path of said stream.

13. The combination, with a plurality of receivers one of which is valveless and is adapted to deliver a stream of material to the other, of beam mechanism for supporting the receivers; means for supplying an overload to the latter, part of which is directed to the valveless receiver; a receptacle normally located at one side of the stream flowing from said valveless receiver; and means connected with the beam mechanism for moving said receptacle into the path of said stream.

14. The combination, with weighing mechanism embodying a plurality of receivers one of which is adapted to deliver a stream of material to the other during the weighing operation, of means for supplying an overload to said receivers; a receptacle normally located at one side of said stream; and means operative during the weighing of a load for moving the receptacle into position to catch the stream.

15. The combination, with weighing mechanism, of means including a valve for supplying an overload to the weighing mechanism; means for effecting the removal of the surplus therefrom; and a surplus-receiving receptacle movable about two axes and connected, respectively, with the valve and the weighing mechanism.

16. The combination, with weighing mechanism, of means for supplying an overload to the weighing mechanism; means for effecting the removal of the surplus therefrom; an oscillatory surplus-receiving receptacle; and an oscillatory carrier for said receptacle.

17. The combination, with weighing mechanism, of means for supplying an overload to the weighing mechanism; means for effecting the removal of the surplus therefrom; a surplus-receiving receptacle; an oscillatory carrier for said receptacle; and means for shifting the carrier.

18. The combination, with weighing mechanism, of means for supplying an overload to the weighing mechanism; means for effecting the removal of the surplus therefrom; a surplus-receiving receptacle; a movably-mounted carrier for the receptacle; and means connected with the weighing mechanism for shifting the carrier to carry the receptacle into position to receive the surplus.

19. The combination, with weighing mechanism, of means for supplying an overload to the weighing mechanism; means for effecting the removal of the surplus therefrom; a surplus-receiving receptacle; a carrier for said receptacle; means for shifting the carrier; and a detent located to hold the carrier in its shifted position.

20. The combination, with weighing mechanism, of means for supplying an overload to the weighing mechanism; means for effecting the removal of the surplus therefrom; a surplus-receiving receptacle; a carrier for the receptacle; means for shifting the carrier; a latch located to hold the carrier in its shifted position; and latch-tripping means operative with the weighing mechanism.

21. The combination, with weighing mechanism, of means for supplying an overload to the weighing mechanism; means for effecting the removal of the surplus therefrom; a surplus-receiving receptacle; a carrier for the receptacle; means for shifting the carrier; a latch carried by the framework for holding the carrier in its shifted position; and latch-tripping means operative with the weighing mechanism.

22. The combination, with weighing mechanism, of means for supplying an overload to the weighing mechanism; means for effecting the removal of the surplus therefrom; a surplus-receiving receptacle; a counterweighted carrier for said receptacle; and means for shifting said carrier.

23. The combination, with weighing mechanism, of means for supplying an overload to the weighing mechanism; means for subsequently effecting the removal of the surplus therefrom; a surplus-receiving receptacle; a carrier for said receptacle, having a projection; and a link connected with the weighing mechanism, having a loop at one end embracing a projection.

24. The combination, with weighing mechanism, of means for supplying an overload to the weighing mechanism; means for subsequently effecting the removal of the surplus therefrom; a surplus-receiving receptacle; a carrier for said receptacle, having an arm; means connected with said arm for shifting the carrier; and a counterweighted latch mounted on the frame, for engaging said arm.

25. The combination, with weighing mechanism, of means for supplying an overload to the weighing mechanism; means for subsequently effecting the removal of the surplus; a surplus-receiving receptacle; a plurality of levers for supporting the same; and means for shifting said levers.

26. The combination, with weighing mechanism, of means for supplying an overload to the weighing mechanism; means for effecting the removal of the surplus; a carrier for the receptacle; means for shifting the carrier whereby the receptacle is carried into position to receive the surplus, and for imparting a return movement thereto; and instrumentalities operative for discharging said receptacle.

27. The combination, with a load-receiver having a discharge-outlet, of a series of inverted V-shaped bars fixed across said outlet; mechanism for supporting said load-receiver; a closer comprehending a shaft mounted on the load-receiver for oscillation; and a series of trough-shaped bars fixed to said shaft and adapted when the closer is shut to cover the spaces between the V-shaped bars.

28. The combination, with weighing mechanism including a load-receiver provided with a closer, of a closer-retarding regulator-plate carried below, and by, the closer and normally transversely disposed thereto; and a connection between the regulator-plate and the load-receiver operable to shift said plate into the path of the material discharged from the load-receiver when the closer is opened.

29. The combination, with weighing mechanism including a load-receiver provided with a closer, of a closer-retarding regulator-plate carried by, and below, the closer and transversely disposed thereto and having a trunnion; a crank-arm secured to said trunnion; and a link connected, respectively, with the crank-arm and the load-receiver, whereby on the opening of the closer said regulator-plate is shifted into the path of the material discharged from said load-receiver.

FRANCIS H. RICHARDS.

Witnesses:
F. N. CHASE,
ANDREW FERGUSON.